United States Patent [19]
Voll et al.

[11] Patent Number: 5,980,745
[45] Date of Patent: Nov. 9, 1999

[54] WIRE MESH FILTER

[75] Inventors: Benn Arild Voll, Houston; Bennett M. Richard, Kingwood; Allen Dale Gabrysch, Houston, all of Tex.

[73] Assignee: Baker Hughes Incorporated, Houston, Tex.

[21] Appl. No.: 09/207,699

[22] Filed: Dec. 8, 1998

Related U.S. Application Data

[63] Continuation of application No. 08/862,889, May 23, 1997, Pat. No. 5,849,188, which is a continuation of application No. 08/647,094, May 9, 1996, abandoned, which is a continuation of application No. 08/418,954, Apr. 7, 1995, Pat. No. 5,624,560, which is a continuation-in-part of application No. 08/320,034, Oct. 7, 1994, Pat. No. 5,642,781.

[51] Int. Cl.$^6$ ........................................ E21B 43/08
[52] U.S. Cl. .................... 210/497.01; 210/498; 210/499; 29/896.6; 166/236
[58] Field of Search ..................... 210/459, 486, 210/484, 492, 497.01, 498, 499; 166/230, 231, 236, 242.5; 29/896.6, 896.62

[56] References Cited

U.S. PATENT DOCUMENTS

| | | |
|---|---|---|
| 1,027,917 | 5/1912 | Smith . |
| 1,229,437 | 6/1917 | Foster . |
| 1,342,986 | 6/1920 | Cater . |
| 2,011,518 | 8/1935 | Griffin . |
| 2,310,507 | 2/1943 | Bodey, Jr. . |
| 2,327,687 | 8/1943 | Williams et al. . |
| 2,530,223 | 11/1950 | Breaux . |
| 2,602,465 | 7/1952 | Goehring . |
| 2,838,120 | 6/1958 | Allmendinger et al. . |
| 2,990,017 | 6/1961 | Powers . |
| 3,087,560 | 4/1963 | Dodson . |
| 3,388,448 | 6/1968 | Lovett . |
| 3,764,525 | 10/1973 | Goodman et al. . |
| 3,816,894 | 6/1974 | Howard et al. . |
| 3,830,373 | 8/1974 | Sixt et al. . |
| 3,996,640 | 12/1976 | Blue et al. . |
| 4,064,938 | 12/1977 | Fast . |

(List continued on next page.)

FOREIGN PATENT DOCUMENTS

| | | |
|---|---|---|
| 133624 | 10/1985 | European Pat. Off. . |
| 2034090 | 1/1969 | France . |
| 794372 | 4/1958 | United Kingdom . |
| 1512621 | 1/1977 | United Kingdom . |
| 2088421 | 6/1982 | United Kingdom . |

OTHER PUBLICATIONS

C. Hamann, "Feindrahtgewebe als Filtermedium," Draht, 39 12, 1988, 1164–1168.

W. Dickenson, et al., "Horizontal Radials Enhance Oil Production From a Thermal Project," Oil & Gas Journal; May 1992, 116 and 118.

W. Dickenson, et al., "Slim Hole Multiple Radials Drilled with Coiled Tubing," Presented at Second Latin American Petroleum Engineering Conference (SPE) in Caracas, Venezuela; Mar. 8–11, 1992,.

(List continued on next page.)

*Primary Examiner*—David A. Reifsnyder
*Attorney, Agent, or Firm*—Rosenblatt & Redano, P.C.

[57] ABSTRACT

A filter is provided which combines a woven wire mesh over a supporting body. The supporting body is typically a metal perforated tube which provides fluid communication between the well bore and the production equipment string. The woven wire mesh acts as a filter to prevent the influx of sand particles, provides openings oriented at various angles relative to its surface, so that some area is available for fluid entry even when particulate matter is lodged on the surface above an opening, provides interior channels that allow fluid to travel from one location on the mesh surface to another location over an opening into the supporting body, and does not provide "straight-through" openings, thus forcing the fluid to make multiple turns to pass through the mesh, thereby dissipating the fluid's energy and increases the mesh's erosion resistance. When particulate matter accumulates on the mesh's surface, the resulting particle cake remains porous, heightening the filter's resistance to plugging.

19 Claims, 7 Drawing Sheets

U.S. PATENT DOCUMENTS

| | | |
|---|---|---|
| 4,204,967 | 5/1980 | Bannister . |
| 4,296,810 | 10/1981 | Price . |
| 4,343,359 | 8/1982 | Krause . |
| 4,428,423 | 1/1984 | Koehler et al. . |
| 4,443,233 | 4/1984 | Moran . |
| 4,487,259 | 12/1984 | McMichael, Jr. . |
| 4,750,561 | 6/1988 | Dickinson et al. . |
| 4,767,426 | 8/1988 | Daly et al. . |
| 4,801,379 | 1/1989 | Ehrsam et al. . |
| 4,821,800 | 4/1989 | Scott et al. . |
| 4,858,691 | 8/1989 | Ilfrey et al. . |
| 4,865,128 | 9/1989 | Dickinson et al. . |
| 4,872,509 | 10/1989 | Dickinson et al. . |
| 4,917,183 | 4/1990 | Gaidry et al. . |
| 4,974,672 | 12/1990 | Dickinson et al. . |
| 5,004,049 | 4/1991 | Arterbury . |
| 5,035,285 | 7/1991 | Dickinson et al. . |
| 5,165,476 | 11/1992 | Jones . |
| 5,190,102 | 3/1993 | Arterbury et al. . |
| 5,200,072 | 4/1993 | Frejborg et al. . |
| 5,223,136 | 6/1993 | Gilbert . |
| 5,230,726 | 7/1993 | Smith et al. . |
| 5,232,048 | 8/1993 | Whitebay et al. . |
| 5,259,512 | 11/1993 | Czerwoniak . |
| 5,293,935 | 3/1994 | Arterbury et al. . |
| 5,318,119 | 6/1994 | Lowry et al. . |
| 5,404,954 | 4/1995 | Whitebay et al. . |
| 5,417,859 | 5/1995 | Bakula . |
| 5,624,560 | 4/1997 | Voll et al. . |

OTHER PUBLICATIONS

W. Dickenson, et al., The Ultrashort Radius Radial System Applied to Thermal Recovery of Heavy Oil, Presented at Western Regional SPE Meeting in Bakersfield, California, Mar. 30–Apr. 1, 1992.

Baker Hughes Integ, "Report # 146 Bakerweld Screen Tech Data Sheets," Nov. 1994.

Scientific and Laboratory Services, "SLS Report # 4807 The Stratapac Downhole Membrane: A New Screen Technology for Sand Control Applications," Apr. 1994.

FIG. 7

WIRE MESH FILTER

This is a continuation of Ser. No. 08/862,889, filed on May 23, 1997, now U.S. Pat. No. 5,849,188, which is a continuation of Ser. No. 08/647,094, filed on May 9, 1996, now abandoned, which was a continuation of Ser. No. 08/418,954, filed on Apr. 7, 1995, issued as 5,624,560, which was a continuation-in-part of Ser. No. 08/320,034, filed on Oct. 7, 1994, which issued as U.S. Pat. No. 5,642,781.

FIELD OF THE INVENTION

The field of the invention is filtering fluids as they are drawn from an oil or gas well reservoir.

BACKGROUND OF THE INVENTION

Oil and gas operators often drill wells into unconsolidated sandstone reservoirs. To obtain high production rates from such reservoirs requires some means of filtering sand out of the fluid as it is drawn from the reservoir. Operators have used screens and gravel packing to accomplish this filtering procedure.

Screens may be used as filters by sizing the screen to block the flow of particles larger than a given size. Traditionally, a sieve analysis is performed on the formation sand prior to completion of the well and the formation sand particle size range is determined. A filter screen size is chosen which will block the largest fifty percent of the formation sand particle sizes.

However, using filters of this size has several problems. First, the available inflow area for these filters is typically only three to six percent of the total filter surface area, which greatly limits the maximum flow rate available from the well. Second, screens used in these filters are typically square or rectangular grids, so that when a particle plugs a grid opening, the inflow area of that opening is lost, further reducing the inflow rate. This lack of alternative flow paths results in a filter which plugs very quickly. Third, these filters are subject to high erosion rates because the fluid flow is effectively straight through the filter material.

One alternative sizing arrangement in these types of filters is to size the filter to block only the largest ten percent of the formation sand particle sizes. This sizing results in filter openings that are approximately twice as large as those which block the largest fifty percent of particle sizes. This sizing technique helps to alleviate the rapid plugging problems of the smaller openings, but also results in much higher erosion rates.

Gravel packing is accomplished by placing a screen or slotted liner in the wellbore production zone, then filling the annular area between the screen or slotted liner and the formation with a specially sized, highly permeable sand. The gravel pack sand is sized so that it will not flow into the production equipment string. It also blocks the flow of formation sand into the production equipment string. Although effective in reducing sand production, gravel packing can be time-consuming. It can also be difficult to accomplish in horizontal wells because of the plugging tendency of current filter screens.

It is a goal of this invention to provide an economical filter that has an open flow area of greater than thirty percent of its total surface area.

It is a further goal of this invention to provide a filter which is damage resistant and which has properties similar to API standards for tensile strength and collapse.

It is another goal of this invention to provide a filter with high erosion resistance in both flow and circulation conditions.

It is another goal of this invention to provide a filter which is highly resistive to plugging by sand or other particulate matter.

SUMMARY OF THE INVENTION

A filter is provided which combines a woven wire mesh over a supporting body. The supporting body is typically a metal perforated tube which provides fluid communication between the well bore and the production equipment string. The woven wire mesh accomplishes four major goals. First, it acts as a filter to prevent the influx of sand particles. Second, it provides openings oriented at various angles relative to its surface, so that some area is available for fluid entry even when particulate matter is lodged on the surface above an opening. Third, the mesh provides interior channels that allow fluid to travel from one location on the mesh surface to another location over an opening into the supporting body. The second and third features increase the effective open surface area of the mesh to greater than thirty percent of its total surface, compared with typical ranges of three to six percent for prior art wire-wrap filters. Fourth, the mesh does not provide "straight-through" openings, thus forcing the fluid to make multiple turns to pass through the mesh. This characteristic dissipates the fluid's energy and increases the mesh's erosion resistance.

To further increase the erosion and collapse resistance of the mesh, a wire-wrap jacket may be positioned between the mesh and the supporting body. This jacket will support the mesh over the locations of the perforations in the supporting body, further increasing the damage resistance of the mesh by preventing weak points where there is no direct support and where the fluid flow is highest.

An outer basketweave jacket may also be provided to both protect the mesh during insertion into the wellbore and to force the fluid through additional turns, further dissipating the flow energy and increasing the erosion resistance of the filter.

DETAILED DESCRIPTION OF THE PREFERRED EMBODIMENT

Figure 1:
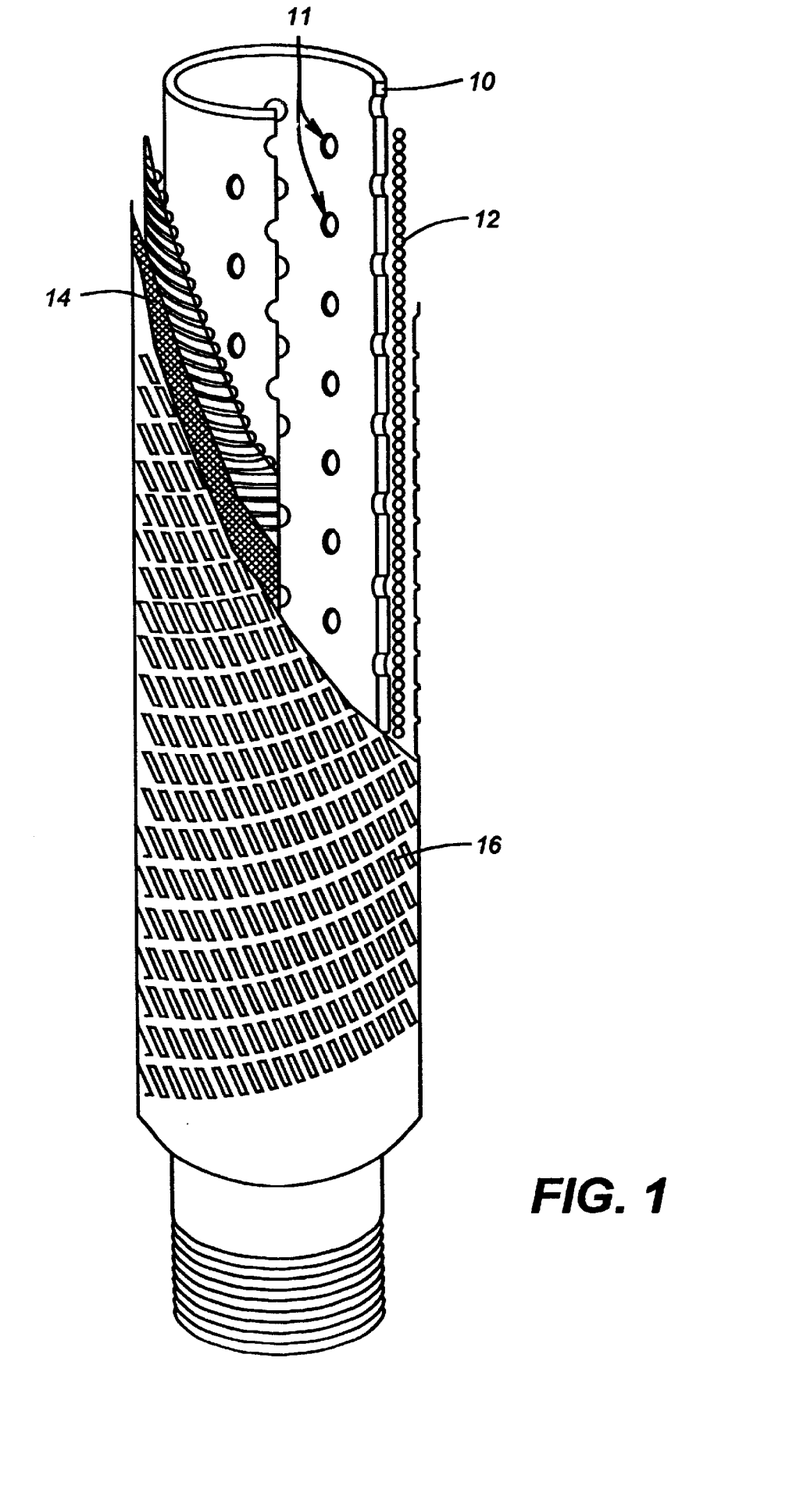
FIG. 1 is a partially cutaway side view of one embodiment of the wire mesh filtration system.

Referring to FIG. 1, one embodiment of the wire mesh filter is shown. The wire mesh filtration system comprises a supporting body 10, such as a typical perforated pipe, a wire-wrap inner jacket 12, a woven wire mesh layer 14, and a protective jacket, such as basketweave jacket 16. The wire-wrap inner jacket 12 forms a cylinder coaxial with and closely wound about the supporting body 10.

Figure 2A:
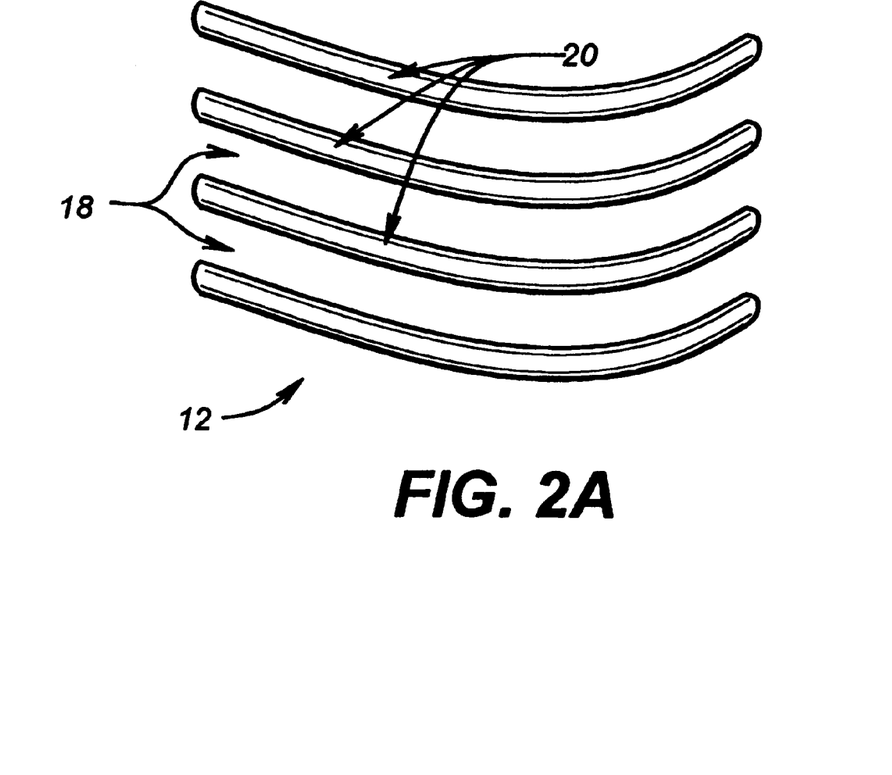
FIG. 2A is one embodiment of the wire-wrap inner jacket.
Figure 2B:
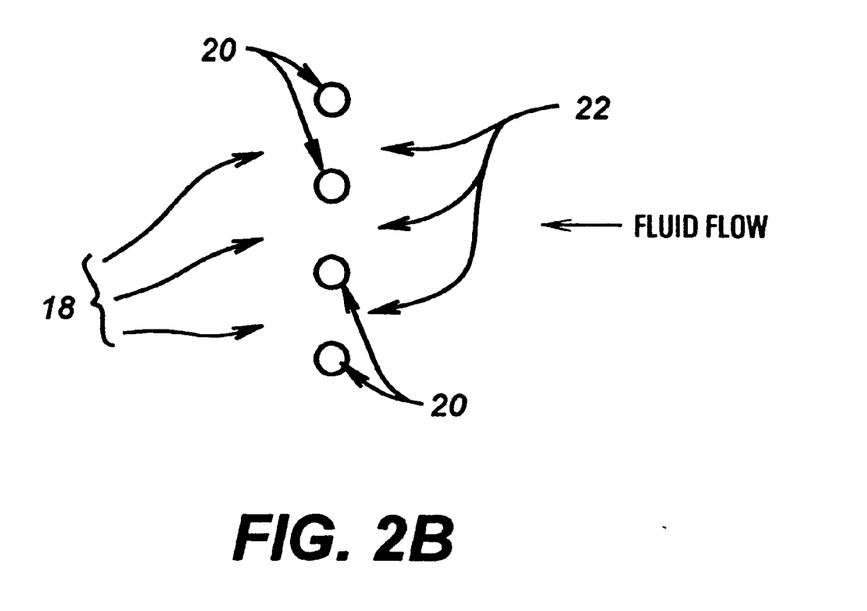
FIG. 2B is a cross-sectional view of the wire-wrap inner jacket depicted in FIG. 2A.

Referring to FIG. 2A–B, The wire-wrap inner jacket 12 is wound so that there are gaps 18 between the windings 20 through which fluid may flow. The size of the gaps 18 is essentially uniform. The wire-wrap inner jacket 12 is preferably made of round wire so that the openings between the windings 20 have mouths 22 that are larger than the gaps 18.

Figure 3A:
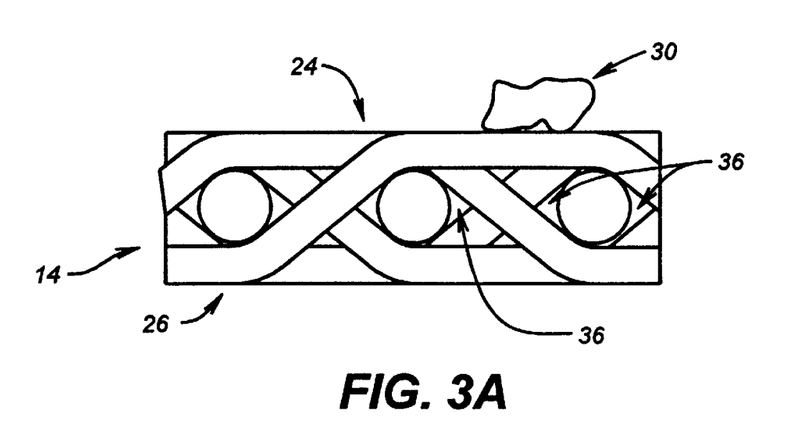
FIG. 3A is a cross-sectional view of one embodiment of the woven wire mesh layer.
Figure 3B:
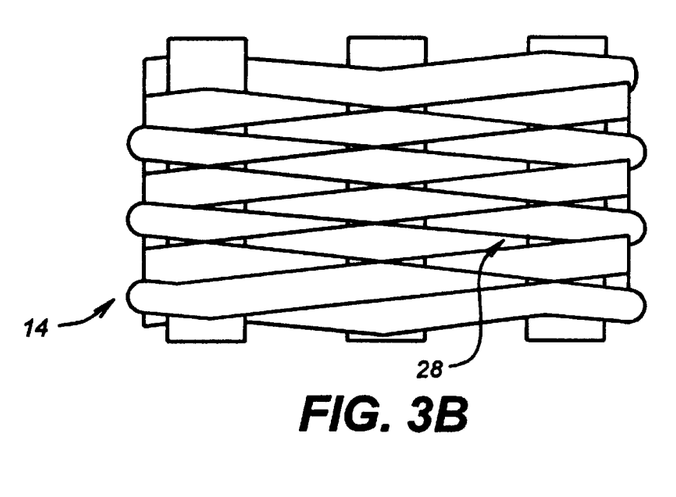
FIG. 3B is a top view of the embodiment of the woven wire mesh layer depicted in FIG. 3A.
Figure 3C:
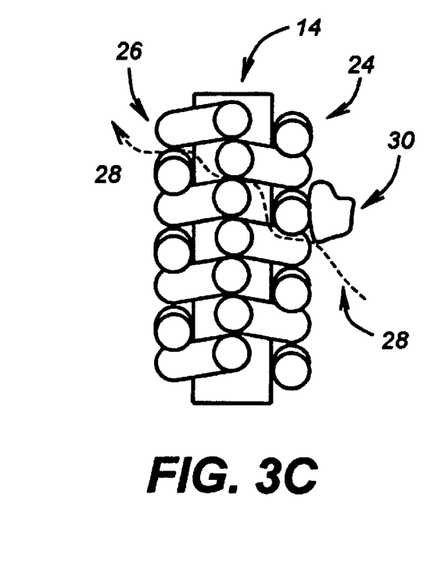
FIG. 3C is a side view of the embodiment of the woven wire mesh layer depicted in FIG. 3A.

Referring again to FIG. 1, the woven wire mesh layer 14 is fitted over and in mechanical contact with the wire-wrap inner jacket 12. Referring to FIGS. 3A–C, a twilled Dutch weave woven wire mesh, preferred for use as the woven wire mesh layer 14, is shown. As shown in FIG. 1, placing the woven wire mesh layer 14 over the wire-wrap inner jacket 12 allows the wire-wrap inner jacket 12 to support the woven wire mesh layer 14 in the areas over the perforation holes 11 in the supporting body 10, thereby improving the damage resistance of the woven wire mesh layer 14 against erosion and collapse.

Referring again to FIGS. 3A–C, fluid may flow from the outer surface 24 of the woven wire mesh layer 14 to the inner surface 26 of the woven wire mesh layer 14 only by flowing in a path such as flow path 28 that is not perpendicular to the outer surface 24 or the inner surface 26. Therefore, the twilled Dutch weave is plug-resistant because a particle 30 which becomes lodged on the outer surface 24 will not prevent flow around the particle into flow path 28. This feature allows fine filtering of the fluid while retaining a large effective open area in the filter.

Figure 4A:
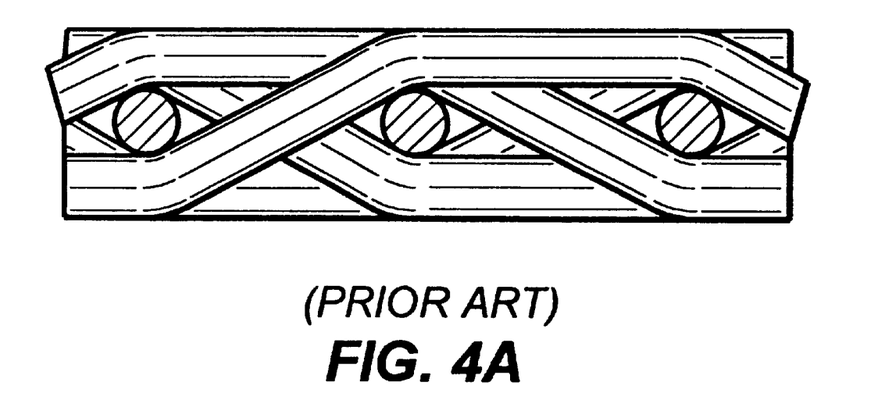
FIG. 4A is a cross-sectional view of a prior art square wire mesh cloth.
Figure 4B:
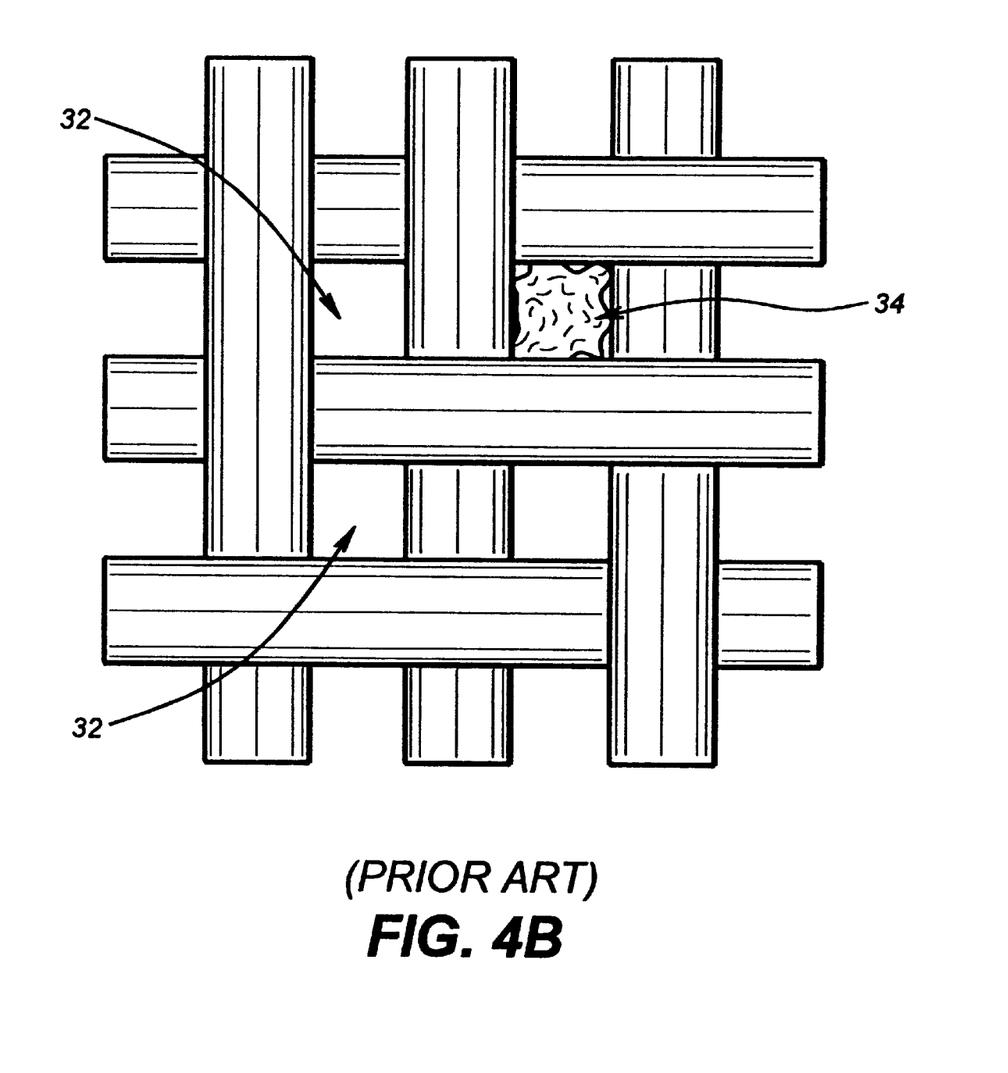
FIG. 4B is a top view of the prior art square wire mesh cloth depicted in FIG. 4A.

By contrast, a standard square mesh wire cloth is shown in FIGS. 4A–B. The square mesh has openings 32 that will trap particles 34 positioned so that there will be no flow through a plugged opening. Once an opening in a square wire mesh is plugged in this fashion, the available total available filter area is reduced by the size of the plugged opening. As with any sized opening, particles smaller than the opening size ("fine particles") will normally pass through the mesh. However, in the case of a square mesh with a large particle blocking a mesh opening, the fine particles are unable to reach the opening and, as more of the mesh openings are blocked by large particles, the fine and large particles will build up on the surface of the mesh forming a "cake." The fine particles can fill the spaces in between the larger particles, so that the cake will have low porosity and flow will be blocked.

The alternate flow paths available to the twilled Dutch weave mesh help to abate this type of plugging, because even when large particles are lodged on the surface, fine particles can flow around the large particles and into the twilled Dutch weave mesh. Thus, the cake may tend to be constructed primarily of large particles and will have high porosity, because the interstitial spaces between the large particles can remain open.

Referring again to FIGS. 3 A–C, the twilled Dutch weave mesh additionally creates flow channels 36 that are essentially parallel to the inner surface 26. Thus, if part of the inner surface 26 is blocked, as, for example, by contact with one of the windings 20 in the wire-wrap inner jacket 12 of FIGS. 2A–B, fluid may travel along the flow channels 36 to a position where the fluid can flow out of the inner surface 26. Therefore, it is preferred that the woven wire mesh layer 14 is oriented so that its flow channels 36 are not parallel to the windings 20 in the wire-wrap inner jacket 12, thus allowing the flow channels 36 to carry fluid from a point where flow is blocked to a point where the flow may reach one of the gaps 18 in the wire-wrap inner jacket 12. Because of its abilities to allow flow even with particles lodged on its surface and to provide flow channels within the mesh, the twilled Dutch weave mesh of the present invention allows the filter to have an effective open surface area of greater than thirty percent of its total surface area.

Figure 5A:
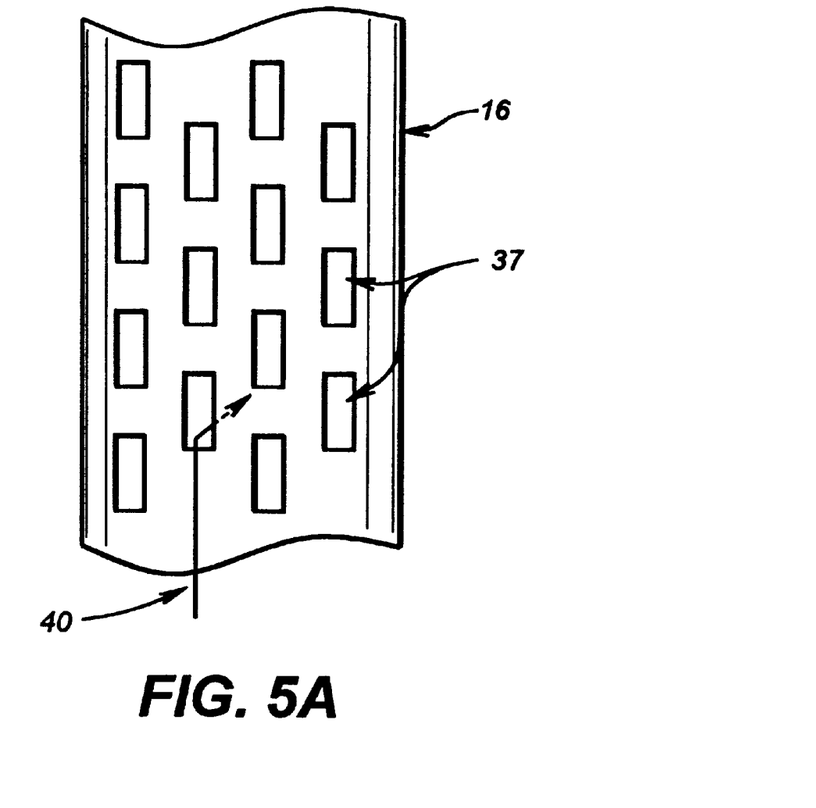
FIG. 5A is one embodiment of the outer protective jacket.
Figure 5B:
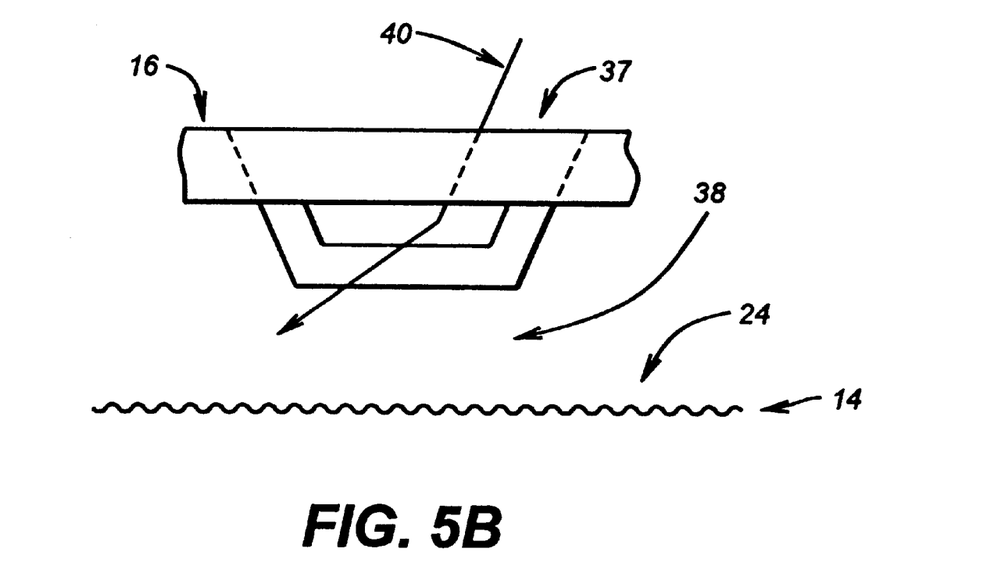
FIG. 5B is a cross-sectional view of the embodiment of the outer protective jacket depicted in FIG. 5A.

Referring again to FIG. 1, the basketweave jacket 16 is concentric with the supporting body 10, the wire-wrap inner jacket 12, and the woven wire mesh layer 14. The basketweave jacket 16 provides a shield to protect the woven wire mesh layer 14 during insertion of the filter downhole. Additionally, Referring to FIGS. 5A–B, the basketweave jacket 16 allows fluid to flow through openings 37 into the annulus 38 between the basketweave jacket 16 and the woven wire mesh layer 14 only by making at least one turn in the flow path 40. Therefore, the basketweave jacket 16 helps to dissipate the flow energy, improving the erosion resistance of the filter. Redirecting the flow in this manner may also allow fluid to sweep across the surface of the woven wire mesh layer 14, thereby reducing the tendency of particle to become embedded on the outer surface 24 of the woven wire mesh layer 14 and possibly dislodging particle which have lodged there. As depicted in FIG. 5A, the openings 37 in the basketweave jacket 16 are preferably aligned substantially along the longitudinal axis of the wire mesh filter, thereby reducing the likelihood of dirt accumulation in the openings 37 during insertion into the well-bore.

To show the improved performance of the twilled Dutch weave mesh over standard square wire mesh filters, tests were run in a Hassler cell using 1.278 inch diameter filter samples. The tests used a flow rate of 500 ml/min of 300 ppm SAE Coarse Test Dust and were terminated when the inlet pressure reached 100 psi. Two such tests were run: (I) comparing 74 micron square mesh wire cloth to 80 micron twilled Dutch weave; and (II) comparing 104 micron square mesh wire cloth to 110 micron twilled Dutch weave. Because the twilled Dutch weave does not provide an easily measurable square hole, the micron sizes of the twilled Dutch weave filters are approximate ratings.

Figure 6:
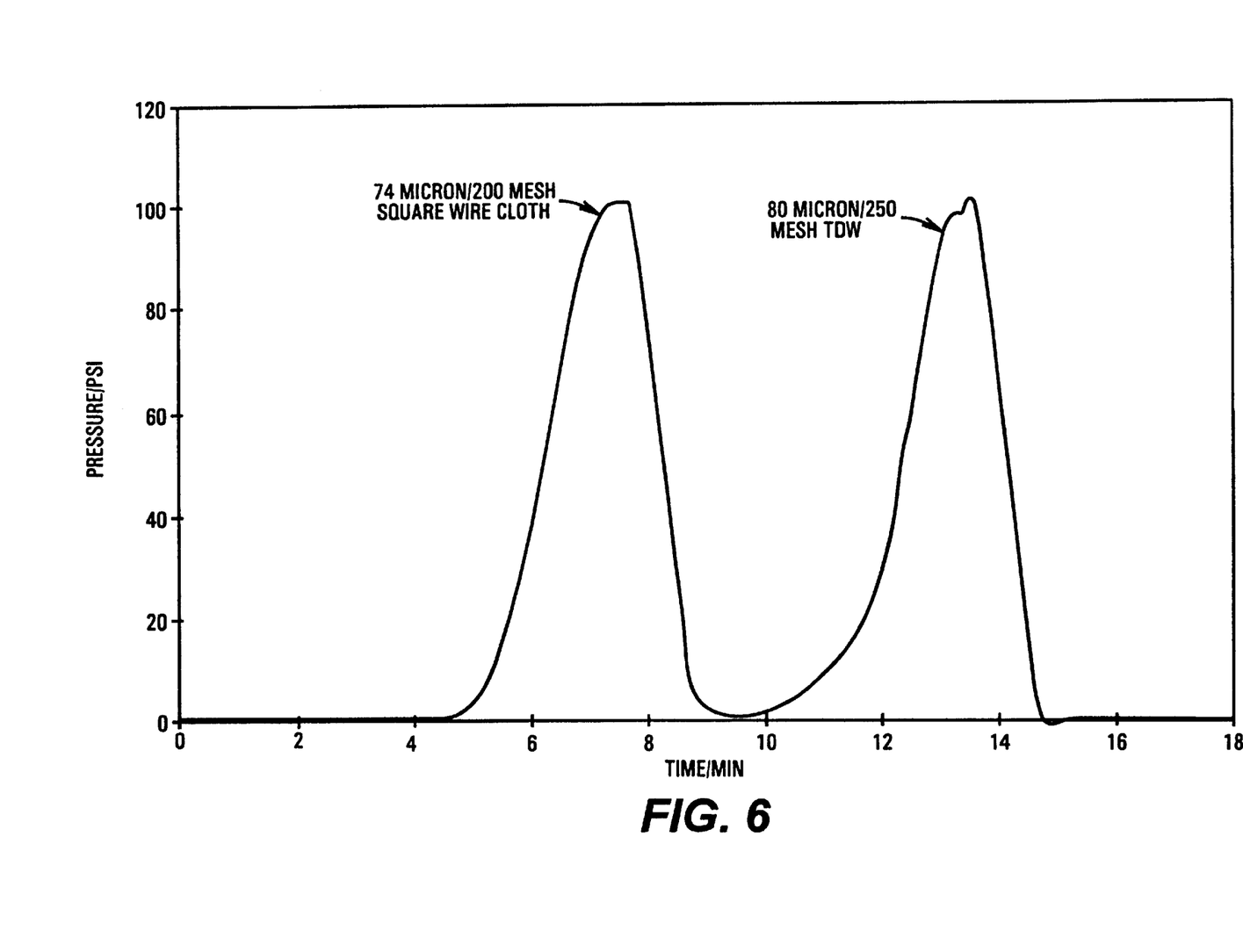
FIG. 6 is a graphical representation of a comparison of 74 micron/200 mesh square wire cloth to 80 micron/250 mesh twilled Dutch weave, using 300 ppm SAE course test dust.
Figure 7:
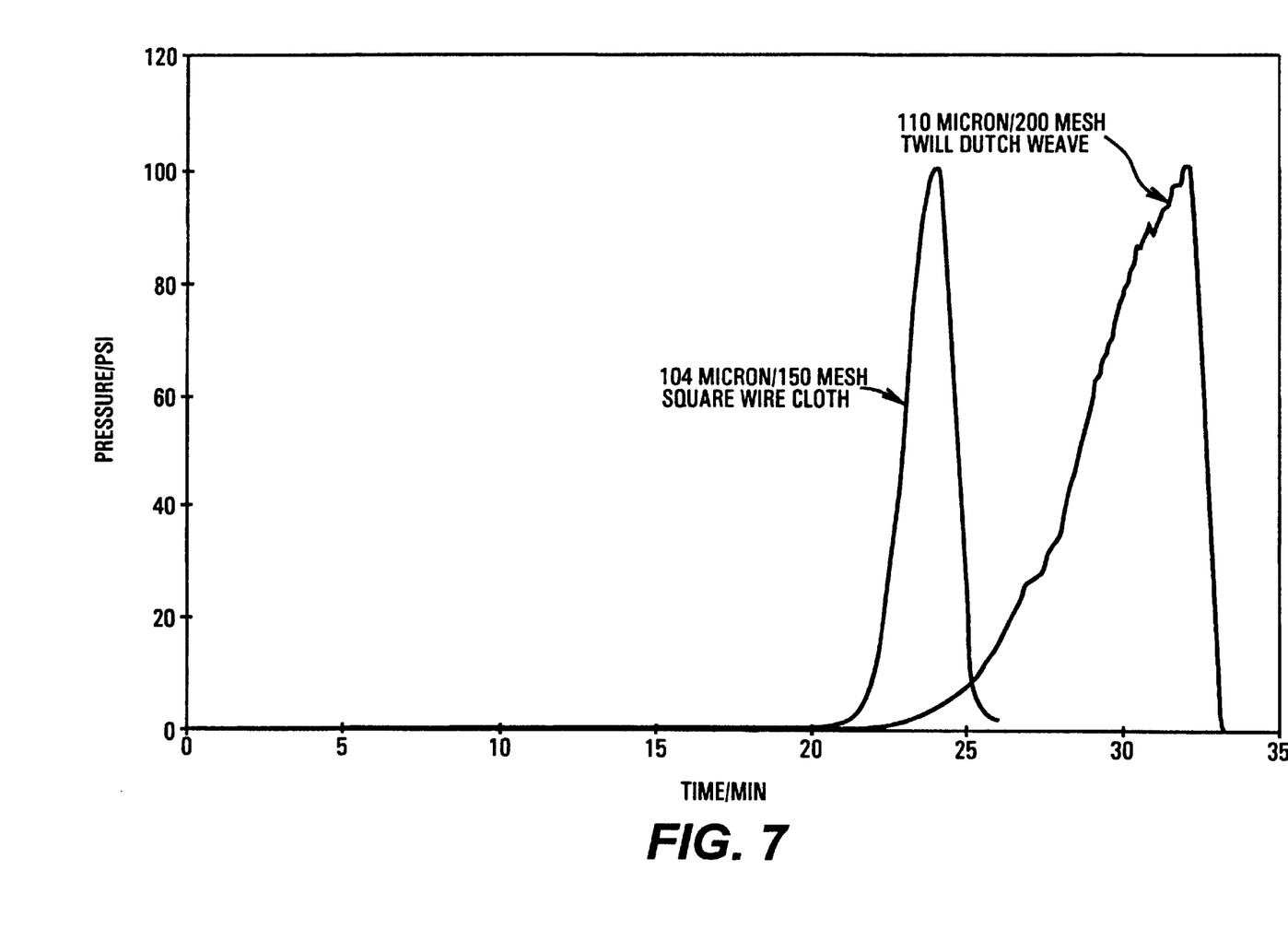
FIG. 7 is a graphical representation of a comparison of 104 micron/150 mesh square wire cloth to 110 micron/200 mesh twilled Dutch weave, using 300 ppm SAE course test dust.

The test results are shown graphically below in FIGS. 6 and 7, corresponding respectively to tests I–II. In both tests, the twilled Dutch weave outperformed the square mesh, not only resisting pressure increases (plugging) for longer periods, but showing a slower rate of pressure increase once plugging began, demonstrating the higher porosity of the cake on the twilled Dutch weave surface. Additionally, the pressure increase curve for the twilled Dutch weave exhibits jagged "steps," exhibiting behavior consistent with fine particles being forced through and flushed out of the interstitial spaces between large particles in the accumulating cake by the building pressure. This effect is more pronounced for the larger mesh (FIG. 7) than for the smaller mesh (FIG. 6), a result which is consistent with the larger mesh's ability to pass larger "fine" particles and thereby break bigger "logjams" of particles. These tests demonstrate the superior quality of the twilled Dutch weave in these mesh sizes for filter applications of this type.

Many modifications and variations may be made in the embodiments described herein and depicted in the accompanying drawings without departing from the concept of the present invention. Accordingly, it is understood that the embodiments described and illustrated herein are illustrative only and are not intended as a limitation upon the scope of this invention.

We claim:

1. A downhole filter apparatus, comprising:

a supporting body;

a porous element mounted to said body;

a jacket mounted over said porous element, said jacket comprising a plurality of defined flowpaths beginning from openings defined in an outer face, said defined paths configured so that a substantial portion of the fluid flowing therethrough between said outer face and an inner face on said jacket makes at least one turn of at least approximately 45° before passing through openings on said inner face and contacting said porous element, each flowpath extending from a said opening in said outer face and further comprises a plurality of structurally discrete paths extending from said opening in said outer face to a plurality of said openings in said inner face, whereupon said jacket dissipates energy of the fluid flowing therethrough to reduce erosion of said porous element.

2. The apparatus of claim 1, wherein:

said jacket has no protrusions on said outer face thereof to allow said jacket to facilitate placement of said filter apparatus downhole.

3. A combined filter assembly and covering, said covering comprising:

a structure further comprising an inside and an outside face and defined flowpaths therein, said flowpaths having ends defined by an inlet opening on said outside face and an outlet opening on said inside face, each flowpath extending from a said opening in said outside face and further comprises a plurality of structurally discrete paths extending from said opening in said outside face to a plurality of said openings in said inside face, said defined flowpaths reducing fluid velocity and, by virtue of the shape of said flowpaths, reorienting the direction of substantially all the flow through said inlet openings for the purpose of reducing erosion effects on said filter assembly.

4. The combination of claim 3, wherein:

said defined flowpaths extend from an inlet to a plurality of outlets.

5. The combination of claim 3, wherein:

said covering has no protrusions on said outer face thereof.

6. The combination of claim 3, further comprising:

said defined flowpath force the fluid in each of them to make one turn before contacting said filter assembly.

7. A combined filter assembly and covering, said covering allowing fluid to pass therethrough without any significant filtration for the purpose of protecting the filter assembly from erosion, said covering comprises:

a structure further comprising an exterior portion defining a plurality of inlet openings thereon and an interior portion which has a plurality of projections and a plurality of outlet openings such that defined flowpaths are formed between said inlet and outlet openings which turn the fluid flowing therethrough at least once;

each flowpath extending from a said opening in said exterior portion and further comprises a plurality of structurally discrete paths extending from said opening in said exterior portion to a plurality of said openings in said interior portion.

8. A downhole filter apparatus, comprising:

a supporting body;

a porous element mounted to said body;

a jacket mounted over said porous element, said jacket comprising a plurality of defined flowpaths extending between openings on an outside face and openings on an inside face, each flowpath extending from a said opening in said outside face and further comprises a plurality of structurally discrete paths extending from said opening in said outside face to a plurality of said openings in said inside face, said defined flowpaths configured so that all the fluid flowing toward said porous element makes at least one turn before contacting said porous element, whereupon said jacket dissipates energy of the fluid flowing therethrough to reduce erosion of said porous element;

said jacket has no protrusions on said outer face thereof.

9. A downhole filter apparatus, comprising:

a supporting body;

a porous element mounted to said body;

a jacket mounted over said porous element, said jacket comprising a plurality of defined flowpaths an outer and an inner face and openings thereon, each flowpath extending from a said opening in said outer face and further comprises a plurality of structurally discrete paths extending from said opening in said outer face to a plurality of said openings in said inner face, each defined flowpath making at least one turn before exiting said jacket near said porous element, whereupon said jacket dissipates energy of the fluid flowing therethrough to reduce erosion of said porous element.

10. The filter apparatus of claim 9, wherein:

said jacket has no protrusions on said outer face thereof.

11. A filter apparatus, comprising:

a perforated body;

a filter screen mounted over said body; and a jacket having an inner and an outer face and openings thereon defining a plurality of flowpaths extending therebetween, each flowpath extending from a said opening in said outer face and further comprises a plurality of structurally discrete paths extending from said opening in said outer face to a plurality of said openings in said inner face, whereupon fluid passing through said jacket turns substantially 90° prior to exit through outlets for contact with said filter screen.

12. A filter apparatus, comprising:

a perforated body;

a filter screen mounted over said body; and a jacket structure mounted over said filter screen and having an inner and outer face and openings thereon defining flowpaths, each flowpath extending from a said opening in said outer face and further comprises a plurality of structurally discrete paths extending from said opening in said outer face to a plurality of said openings in said inner face, said flowpaths turn incoming fluid substantially 90° before contact with said filter screen.

13. The apparatus of claim 12, further comprising:

a punch-in to create said substantially 90° turn.

14. A filter apparatus for downhole use, comprising:

a perforated body;

a filter screen mounted over said body;

a covering for said filter screen comprising inlets and outlets offset from said inlets on an inner and outer face and further comprising flowpaths, each flowpath extends from a said opening in said outer face and further comprises a plurality of structurally discrete paths extending from said opening in said outer face to a plurality of said openings in said inner face, to direct the flow therethrough.

15. A downhole filter apparatus, comprising:

a supporting body;

a porous element mounted to said body;

a jacket mounted over said porous element, said jacket comprising a plurality of defined flowpaths beginning from openings defined in an outer face, said defined paths configured so that a substantial portion of the fluid flowing there-through between said outer face and an inner face on said jacket makes at least one turn of at least approximately 45° before passing through openings on said inner face and contacting said porous element, whereupon said jacket dissipates energy of the fluid flowing therethrough to reduce erosion of said porous element; and said porous element further comprises:

a woven wire mesh layer mounted on said supporting body;

said woven wire mesh layer comprising a weave of wires which define an inner and outer surface and a plurality of paths running between said surfaces and generally parallel thereto;

said weave configured so that openings that begin at said outer surface are offset from outlets on said inside surface.

16. A downhole filter apparatus, comprising:

a supporting body;

a woven wire mesh layer mounted on said supporting body;

said woven wire mesh layer comprising a weave of wires which define an inner and outer surface and a plurality of paths running between said surfaces and generally parallel thereto, with a first set of inclined passages extending from the paths to the inner surfaces, and with a second set of inclined passages extending from the path to the outer surface;

said weave configured so that openings that begin at said outer surface are offset from outlets on said inside surface;

a jacket over said woven wire mesh layer, having openings thereon;

said jacket comprises an inner surface and an outer surface, and wherein said openings provide at least one fluid pathway between said outer surface of said jacket and said woven wire mesh layer such that fluid flowing through said fluid pathway makes at least one change of flow direction as it passes therethrough.

17. A downhole filter apparatus, comprising:

a supporting body;

a porous element mounted to said body;

a jacket mounted over said porous element, said jacket comprising a plurality of defined flowpaths, each defined flowpath extending from an inlet opening and making at least one turn before exiting said jacket at on outlet opening near said porous element, whereupon said jacket dissipates energy of the fluid flowing therethrough to reduce erosion of said porous element;

said porous element further comprises:

a woven wire mesh layer mounted on said supporting body;

said woven wire mesh layer comprising a weave of wires which define an inner and outer surface and a plurality of paths running between said surfaces and generally parallel thereto;

said weave configured so that openings that begin at said outer surface are offset from outlets on said inside surface.

18. A filter apparatus, comprising:

a supporting body;

a woven wire mesh layer mounted on said supporting body, said woven wire mesh layer further comprising an outer surface and an inner surface such that fluid can flow from said outer surface to said inner surface in a path which is not substantially perpendicular to said outer surface or said inner surface;

a jacket mounted on said woven wire mesh layer, said jacket further comprising a plurality of openings;

wherein said jacket comprises an inner surface and an outer surface, and wherein said openings define at least one fluid pathway between said outer surface of said jacket and said woven wire mesh layer such that fluid flowing through said fluid pathway makes at least one change of flow direction as it passes therethrough.

19. The filter apparatus of claim 17, further comprising:

a wire-wrap inner jacket mounted on said supporting body and placed between said supporting body and said woven wire mesh layer.

* * * * *

UNITED STATES PATENT AND TRADEMARK OFFICE
CERTIFICATE OF CORRECTION

PATENT NO. : 5,980,745
DATED : November 9, 1999
INVENTOR(S) : Benn Arild Voll, Bennett M. Richard and Allen Dale Gabrysch It is certified that error appears in the above-identified patent and that said Letters Patent is hereby corrected as shown below:

ON THE TITLE PAGE:
after item [63]

insert --[*] Notice: The term of this patent shall not extend past the expiration date of Patent Nos. 5,624,560 and 5,849,188--.

Signed and Sealed this

Eleventh Day of July, 2000

*Attest:*

Q. TODD DICKINSON

*Attesting Officer*     *Director of Patents and Trademarks*